(12) United States Patent
Roji et al.

(10) Patent No.: US 9,883,470 B2
(45) Date of Patent: Jan. 30, 2018

(54) COMMUNICATION DEVICE AND METHOD FOR PERFORMING RADIO COMMUNICATION

(71) Applicant: Intel IP Corporation, Santa Clara, CA (US)

(72) Inventors: Alejandro Roji, Dresden (DE); Jose Cesares Cano, Dresden (DE); Mathias Kurth, Dresden (DE); Thomas Fliess, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/356,767

(22) Filed: Nov. 21, 2016

(65) Prior Publication Data

US 2017/0181107 A1 Jun. 22, 2017

(30) Foreign Application Priority Data

Dec. 21, 2015 (DE) .......................... 10 2015 122 441

(51) Int. Cl.
*H04W 52/50* (2009.01)
*H04B 1/04* (2006.01)
(Continued)

(52) U.S. Cl.
CPC .............. *H04W 52/50* (2013.01); *H04B 1/04* (2013.01); *H04W 52/365* (2013.01);
(Continued)

(58) Field of Classification Search
CPC ............. H04W 72/0453; H04W 52/06; H04W 52/367; H04W 24/02; H04W 52/04; H04W 52/248
(Continued)

(56) References Cited

U.S. PATENT DOCUMENTS 6,615,028 B1 * 9/2003 Loke ..................... H03F 1/0277
 455/102
9,113,422 B2 * 8/2015 Jeong .................. H04W 52/146
(Continued)

OTHER PUBLICATIONS

Unknown, "Evolved Universal Terrestrial Radio Access (E-UTRA); User Equipment (UE) radio transmission and reception", Oct. 2013, 3GPP TS 36.101 version 11.6.0 Release 11, ETSI, France.
(Continued)

*Primary Examiner* — Keith Ferguson
(74) *Attorney, Agent, or Firm* — Viering, Jentschura & Partner mbB

(57) ABSTRACT

A communication device is provided that includes a first transmission circuit configured to transmit radio signals with a first transmission power range up to a first predefined transmission power. The communication device further includes a second transmission circuit configured to transmit the radio signals with a second transmission power range up to a second predefined transmission power. The communication device further includes a baseband circuit configured to select a transmission circuit from the first transmission circuit and the second transmission circuit and to generate a signal based on the predefined transmission power of the selected transmission circuit. The baseband circuit is configured to apply the signal to the selected transmission circuit to be transmitted by the selected transmission circuit.

25 Claims, 12 Drawing Sheets

(51) Int. Cl.
*H04W 52/36* (2009.01)
*H04W 74/08* (2009.01)
*H04W 88/02* (2009.01)

(52) U.S. Cl.
CPC ..... *H04W 52/367* (2013.01); *H04W 74/0833* (2013.01); *H04B 2001/0491* (2013.01); *H04W 88/02* (2013.01)

(58) Field of Classification Search
USPC ........ 455/522, 69, 127.1, 127.2, 127.3, 500, 455/517, 73, 91, 550.1, 341, 422.1, 575.7, 455/403, 445, 553.1; 375/297, 219; 330/295, 132
See application file for complete search history.

(56) References Cited

U.S. PATENT DOCUMENTS

| | | | | |
|---|---|---|---|---|
| 2012/0282865 | A1* | 11/2012 | Liang | H04B 17/16 455/73 |
| 2013/0183917 | A1* | 7/2013 | Asuri | H04B 1/0483 455/127.5 |
| 2013/0295989 | A1* | 11/2013 | Smadi | H04W 72/1215 455/553.1 |
| 2014/0038673 | A1 | 2/2014 | Kim et al. | |
| 2014/0233445 | A1 | 8/2014 | Yang et al. | |

OTHER PUBLICATIONS

Unknown, "Evolved Universal Terrestrial Radio Access (E-UTRA); Physical layer procedures", Mar. 2014, 3GPP TS 36.213 version 11.6.0 Release 11, ETSI, France.

Unknown, "Evolved Universal Terrestrial Radio Access (E-UTRA); Medium Access Control (MAC) protocol specification", Apr. 2015, 3GPP TS 36.321 version 11.6.0 Release 11, ETSI, France.

Unknown, "Evolved Universal Terrestrial Radio Access (E-UTRA); Radio Resource Control (RRC); Protocol specification", Jan. 2014, 3GPP TS 36.331 version 11.6.0 Release 11, ETSI, France.

Unknown, "Radio-link criterion for preamble group selection", Nov. 10-14, 2008, 3GPP TSG RAN WG2 #64 R2-086568, Prague, Czech Rep.

German Office Action based on Application No. 10 2015 122 441.0 (7 Pages) dated Aug. 2, 2016 (Reference Purpose Only).

* cited by examiner

COMMUNICATION DEVICE AND METHOD FOR PERFORMING RADIO COMMUNICATION

RELATED APPLICATIONS

This application claims priority of German patent application No. 10 2015 122 441.0, filed on Dec. 21, 2015, the entire contents of which are hereby incorporated herein by reference.

TECHNICAL FIELD

The present disclosure relates to communication devices and methods for performing radio communication.

BACKGROUND

In a scenario, a wireless device communicates with a base station of a communication network via an established connection or the wireless device initializes a connection. The wireless device may provide configuration information of the wireless device to the base station. It may be desirable to provide accurate and reliable information.

SUMMARY

A communication device is provided that includes a first transmission circuit configured to transmit radio signals with a first transmission power range up to a first predefined transmission power. The communication device further includes a second transmission circuit configured to transmit the radio signals with a second transmission power range up to a second predefined transmission power. The communication device further includes a baseband circuit configured to select a transmission circuit from the first transmission circuit and the second transmission circuit and to generate a signal based on the predefined transmission power of the selected transmission circuit. The baseband circuit is configured to apply the signal to the selected transmission circuit to be transmitted by the selected transmission circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A communication device may be configured to provide an accurate value of a maximum transmission power of the communication device in a radio communication. Further, the communication device may be configured to select appropriate information signals in a random access procedure based on the maximum transmission power of the communication device to provide a precise value of the maximum transmission power of the communication device. Moreover, a radio communication network may be configured to provide information to mobile wireless communication devices that may be a basis for a determination of the maximum transmission power of the communication device.

Various aspects of this disclosure provide a communication device that may include a first transmission circuit configured to transmit radio signals with a first transmission power range up to a first predefined transmission power. Further, the communication device may include a second transmission circuit configured to transmit the radio signals with a second transmission power range up to a second predefined transmission power. Moreover, the communication device may include a baseband circuit configured to select a transmission circuit from the first transmission circuit and the second transmission circuit and to generate a signal based on the predefined transmission power of the selected transmission circuit. Further, the baseband circuit may be configured to apply the signal to the selected transmission circuit to be transmitted by the selected transmission circuit. Thus, the energy consumption of the communication device may be low. Further, the communication device may be configured to communicate reliably.

Figure 1:
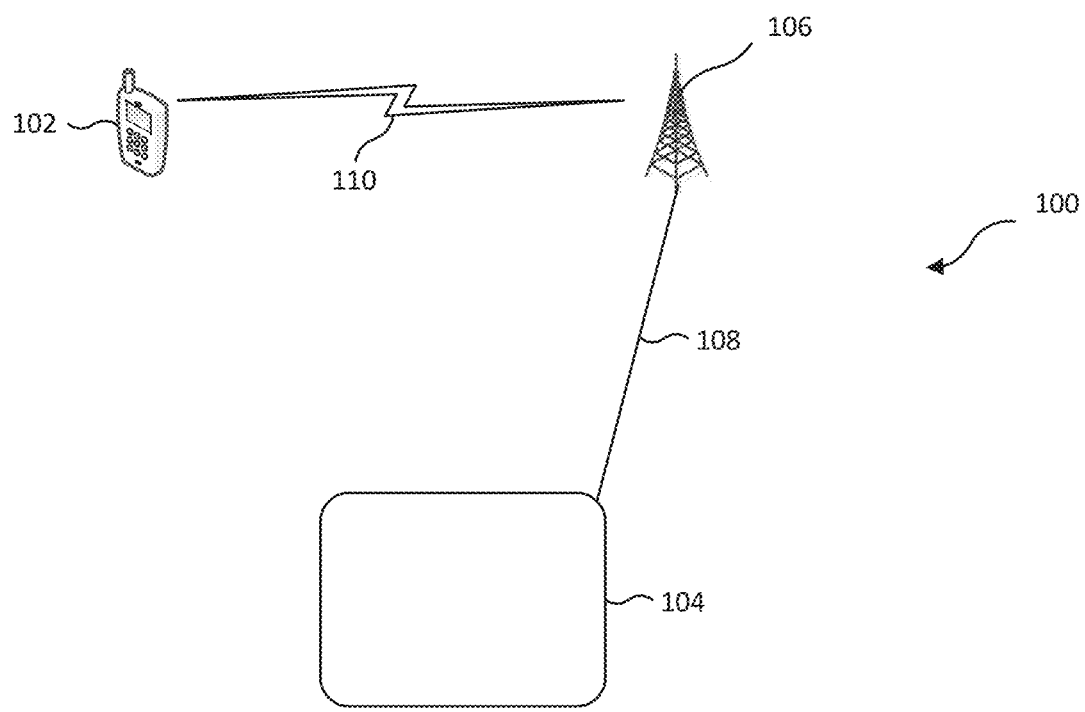
FIG. 1 shows a schematic drawing of a mobile radio communication system based on a Long Term Evolution communication technology and a first mobile wireless device.

FIG. 1 shows a schematic drawing of a mobile radio communication system 100 based on a Long Term Evolution (LTE) communication technology and a first mobile wireless device 102. The mobile radio communication system 100 may include a core network 104 and a base station 106 that may be connected with the core network 104 via a first connection 108. The base station 106 may be connected with the first mobile wireless device 102 via a first radio frequency connection 110.

Figure 2:
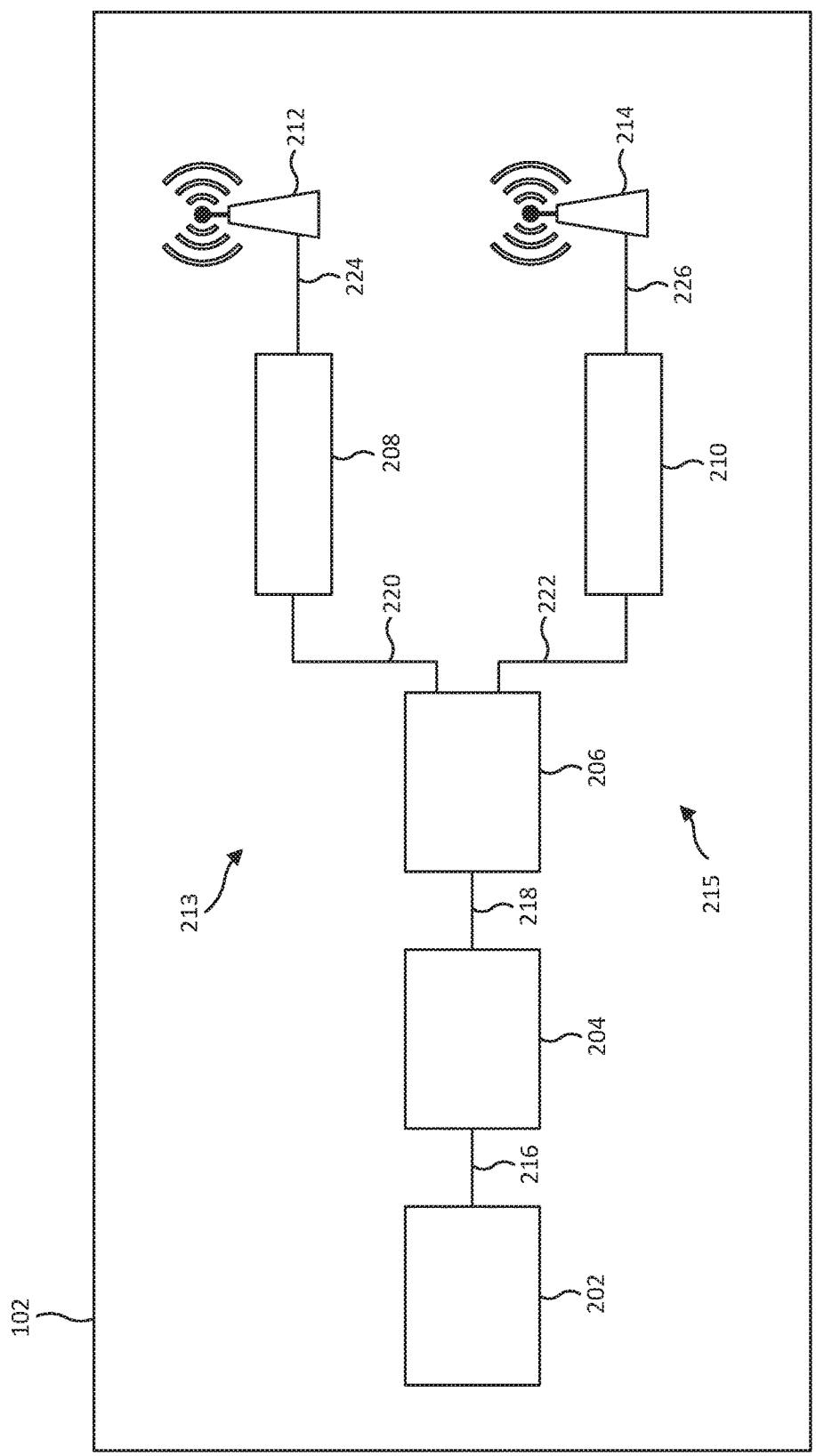
FIG. 2 shows a schematic drawing of the first mobile wireless device according to an example.

FIG. 2 shows a schematic drawing of the first mobile wireless device 102 according to an example. The first mobile wireless device 102 may include a baseband circuit 202, a transceiver circuit 204, a radio frequency front end circuit 206, a first front end path circuit 208, a second front end path circuit 210, a first antenna 212 and a second antenna 214. The transceiver circuit 204, the radio frequency front end circuit 206, the first front end path circuit 208 and the first antenna 212 may be a first transmission circuit 213. Further, the transceiver circuit 204, the radio frequency front end circuit 206, the second front end path circuit 210 and the second antenna 214 may be a second transmission circuit 215.

Moreover, the baseband circuit 202 may be connected with the transceiver circuit 204 via a second connection 216. The transceiver circuit 204 may be connected with the radio frequency front end circuit 206 via a third connection 218. The radio frequency front end circuit 206 may include a power amplifier, a duplexing circuit and a switching circuit and may be connected with the first front end path circuit 208 via a fourth connection 220 and with the second front end path circuit 210 via a fifth connection 222. The first front end path circuit 208 may be connected with the first antenna 212 via a sixth connection 224. The second front end path circuit 210 may be connected with the second antenna 214 via a seventh connection 226.

Further, the baseband circuit 202 may be configured to generate a signal including a first signal and a second signal, to select a transmission circuit from the first transmission circuit 213 and the second transmission circuit 215 and to transmit the signal to the transceiver circuit 204. The transceiver circuit 204 may be configured to modulate the signal and to transmit the modulated signal to the radio frequency front end circuit 206. The radio frequency front end circuit 206 may be configured to determine a power amplified output signal based on the modulated signal and to transmit the output signal via one of the first front end path circuit 208 to the first antenna 212 or the second front end path circuit 210 to the second antenna 214 depending on the selected transmission circuit. The antenna of the selected transmission circuit may be configured to transmit the output signal of the radio frequency front end circuit 206 via the first radio frequency connection 110 to the base station 106.

Figure 3:
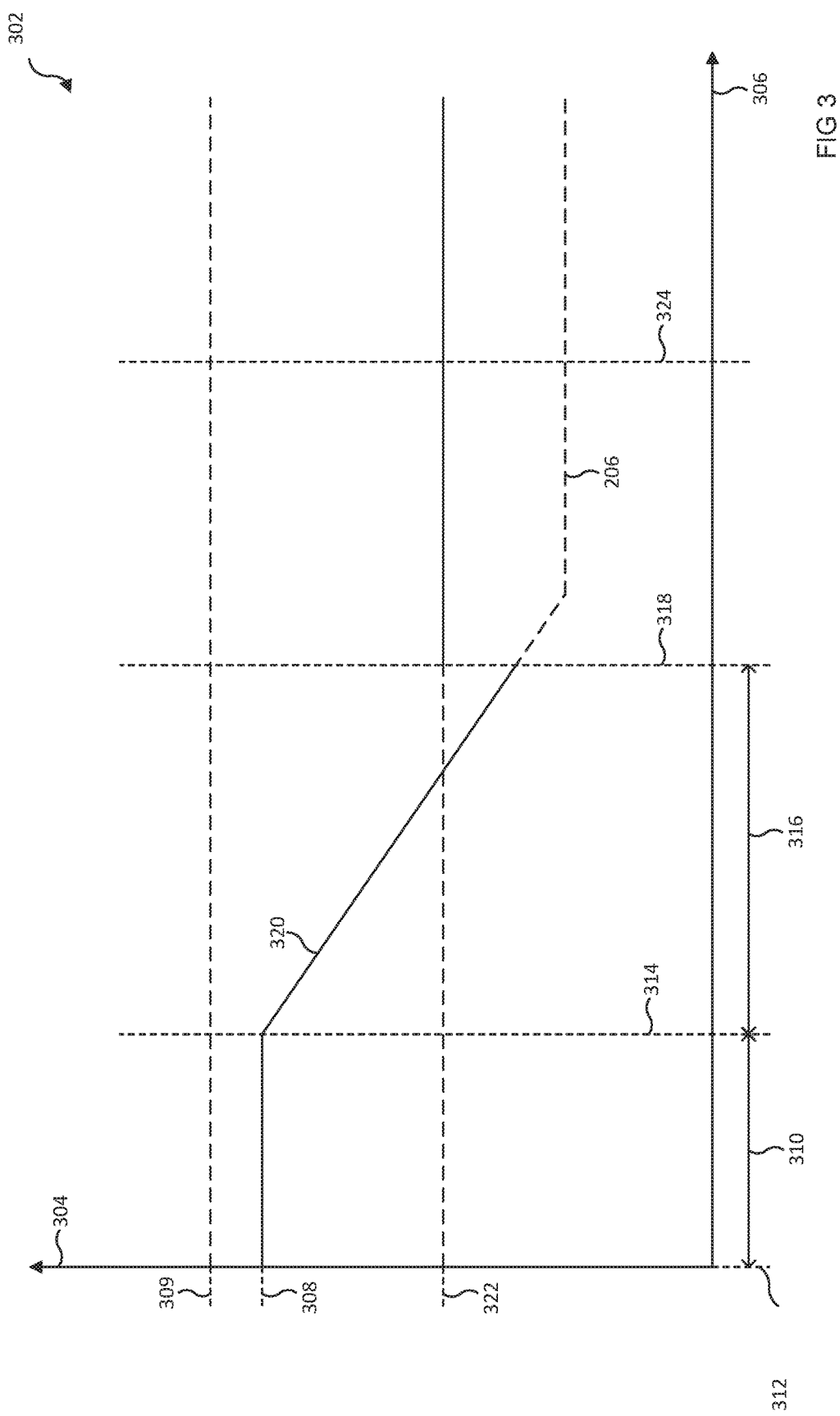
FIG. 3 shows a schematic diagram of transmission powers of transmission circuits of the first mobile wireless device with respect to a time flow.

FIG. 3 shows an exemplary schematic diagram 302 of transmission powers of the transmission circuits 213 and 215, respectively with respect to a time flow. The diagram 302 may have a first axis 304 that may indicate transmission powers of the transmission circuits 213 and 215 and a and a second axis 306 that may indicate times of a time flow.

Further, the baseband circuit 202 may be configured to apply the first signal to the first transmission circuit 213 to be transmitted with a first transmission power 308 in a first time section 310 between a first time 312 and a second time 314. The first transmission power 308 may be smaller than a first maximum transmission power 309 of the first transmission circuit 213. The first maximum transmission power 309 may be a maximum of the transmission power of the first transmission circuit 213. Moreover, in a second time section 316 between the second time 314 and a third time 318, the first transmission circuit 213 may be configured to transmit the first signal with a decreasing transmission power 320.

Further, the baseband circuit 202 may be configured to select the second transmission circuit 215 at the third time 318 and to apply the second signal to be transmitted via the second transmission circuit 215. The second transmission circuit 215 may be configured to transmit radio signals with a transmission power up to a second maximum transmission power 322. The second maximum transmission power 322 may be a maximum of the transmission power of the second transmission circuit 215. The second maximum transmission power 322 may be smaller than the first maximum transmission power 309. Further, the second maximum transmission power 322 may be smaller than a nominal maximum transmission power in accordance with the LTE communication technology. In an example, the nominal maximum transmission power may be a transmission power of a User Equipment Power Class in accordance with the LTE communication technology.

Moreover, the baseband circuit 202 may be configured to generate a third signal of the signal at a fourth time 324 that may include a Power Headroom Report in accordance with the LTE communication technology. The Power Headroom Report may include a power headroom PH that the baseband circuit 202 may be configured to determine in consideration of a determined maximum transmission power $P_{CMAX,c}$, a maximum allowed user equipment power output $P_{EMAX,c}$ that may be signaled by a higher layer based on the Open Systems Interconnection (OSI) model, a first value $\Delta T_{C,c}$ that may be related to a transmission bandwidth of the radio frequency connection 110, a current transmission power Ptx of a current transmission, a nominal maximum transmission power $Ptx_{max,nominal}$ of the selected transmission circuit, a Maximum Power Reduction value $MPR_c$, an additional Maximum Power Reduction value $AMPR_c$, an additional tolerance value $\Delta T_{IB,c}$ and a Power Management Maximum Power Reduction value $PMPR_c$ based on the LTE communication technology by a formula (1):

$$PH = P_{CMAX,c} - Ptx \quad (1)$$

in consideration of formulas (2), (3) and (4):

$$P_{CMAXL,c} = \min\{P_{EMAX,c} - \Delta T_{C,c}, Ptx_{max,nominal} - \max(MPR_c + AMPR_c + \Delta T_{IB,c} + \Delta T_{C,c}, PMPR_c)\} \quad (2)$$

$$P_{CMAXH,c} = \min\{P_{EMAX,c}, Ptx_{max,nominal}\} \quad (3)$$

and $$P_{CMAXL,c} \leq P_{CMAX,c} \leq P_{CMAXH,c} \quad (4)$$

In an example, the nominal maximum transmission power $Ptx_{max,nominal}$ may be the maximum transmission power of the selected transmission circuit. Further, the baseband circuit 202 may be configured to determine the power headroom PH to be 0 at the fourth time 324 based on the formulas (1) to (4). The power headroom 0 may correspond to a transmission of the actual maximum transmission power of the first mobile wireless device. Further, negative power headrooms may correspond to transmissions that have a higher transmission power than the nominal maximum transmission power $Ptx_{max,nominal}$.

Figure 4:
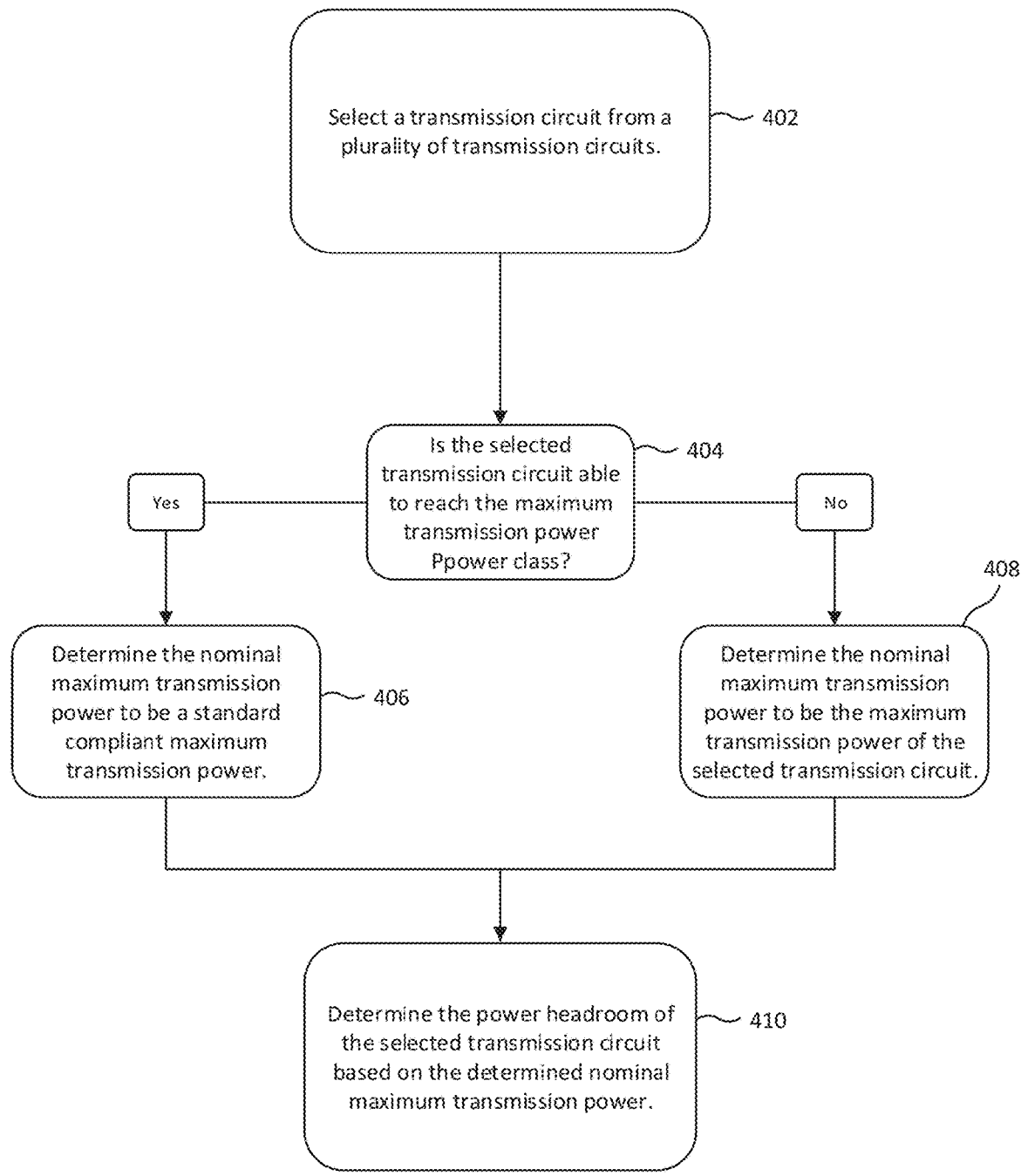
FIG. 4 shows a flow diagram of a maximum transmission power determination of a selected transmission circuit of the first mobile wireless device according to the example of FIG. 1 to FIG. 3.

FIG. 4 shows a flow diagram of a maximum transmission power determination of the selected transmission circuit of the first mobile wireless device according to the example of FIG. 1 to FIG. 3.

The baseband circuit 202 may be configured to select, in 402, a transmission circuit from a plurality of transmission circuits. The plurality of transmission circuits may include the first transmission circuit and the second transmission circuit.

Further, the baseband circuit 202 may, in 404, be configured to determine if the selected transmission circuit is compliant with a radio communication technology. The radio communication technology may be the LTE communication technology.

Moreover, if the selected transmission circuit is compliant with the radio communication technology, the baseband circuit 202 may be configured to determine the nominal maximum transmission power $Ptx_{max,nominal}$ of the selected transmission circuit to be a technology compliant maximum transmission power Ppowerclass in accordance with the radio communication technology.

Further, if the selected transmission circuit is not compliant with the radio communication technology, the baseband circuit 202 may be configured to determine the nominal maximum transmission power $Ptx_{max,nominal}$ of the selected transmission circuit to be the maximum transmission power of the selected transmission circuit.

Further, the baseband circuit 202 may, in 410, be configured to determine the power headroom of the selected transmission circuit by formulas (1), (2), (3) and (4) based on the determined nominal maximum transmission power $Ptx_{max,nominal}$.

Figure 5:
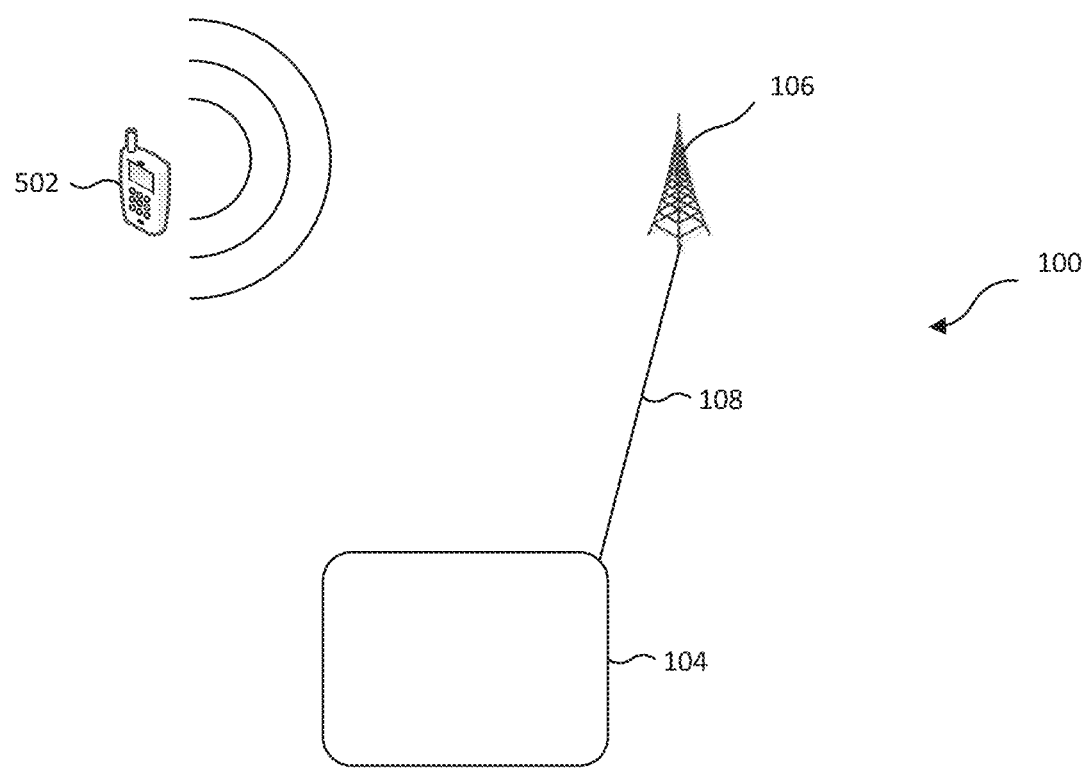
FIG. 5 shows a schematic drawing of the mobile radio communication system and the first mobile wireless device in a random access procedure of a radio resource control connection establishment.

FIG. 5 shows a schematic drawing of the mobile radio communication system 100 and the first mobile wireless device 102. The first mobile wireless device 102 may be configured to establish a connection with the base station 106 by a random access procedure.

Figure 6:
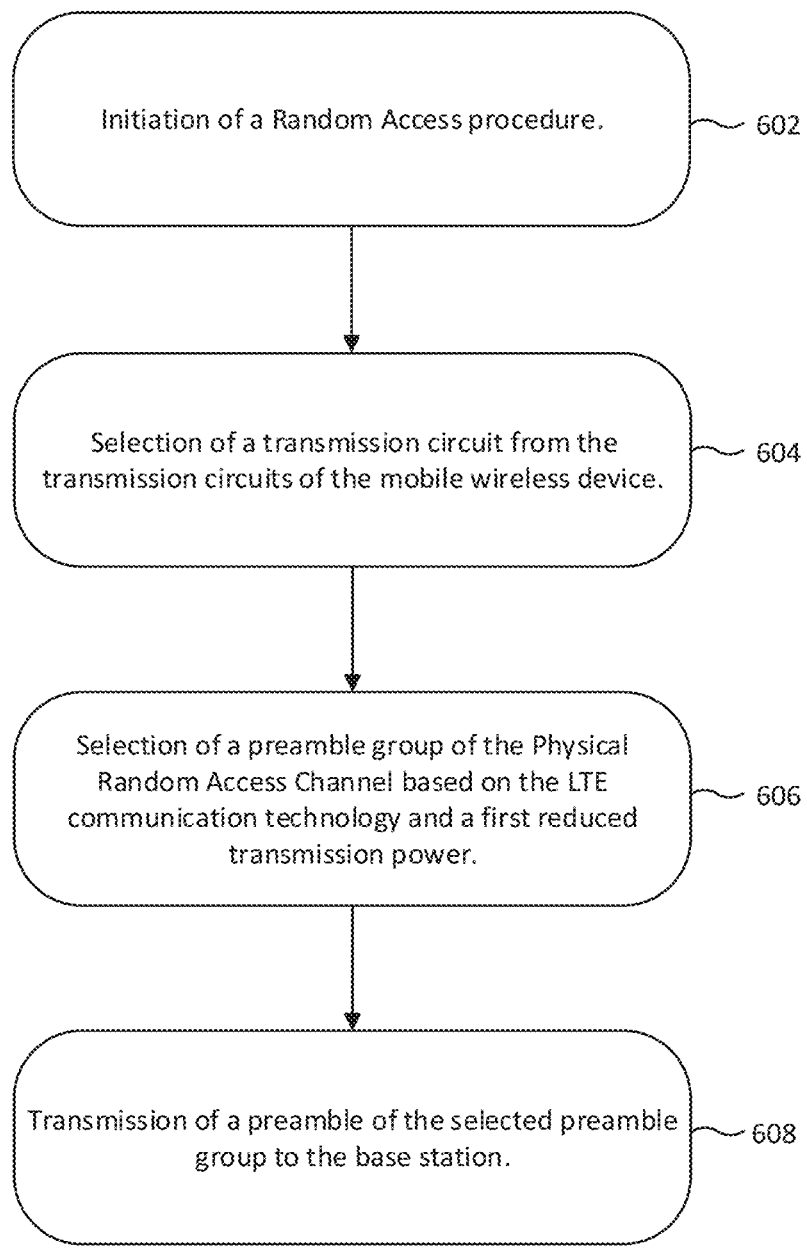
FIG. 6 shows a flow diagram of the random access procedure of the first mobile wireless device.

FIG. 6 shows a flow diagram of the random access procedure of the first mobile wireless device 102.

The first mobile wireless device 102 may, in 602, be configured to initiate a random access procedure of the radio resource control connection establishment.

Moreover, the first mobile wireless device 102 may, in 604, be configured to to select a transmission circuit from the transmission circuits 213 and 215.

Further, the first mobile wireless device 102 may, in 606, be configured to select a preamble group of the Physical Random Access Channel based on the LTE communication technology and on a first reduced transmission power $P_{CMAX,c,1}$.

The baseband circuit 202 may be configured to determine the first reduced transmission power $P_{CMAX,c,1}$ based on a Maximum Power Reduction information, an Additional Maximum Power Reduction information and the nominal maximum transmission power $Ptx_{max,nominal}$ of the selected transmission circuit. The Maximum Power Reduction information may include Maximum Power Reductions MPR of a plurality of Maximum Power Reductions that are associated with frequency ranges of a plurality of frequency ranges. Further, the Additional Maximum Power Reduction information may include Additional Maximum Power Reductions of a plurality of Additional Maximum Power Reductions that are associated with the frequency ranges of the plurality of frequency ranges.

Moreover, the baseband circuit 202 may be configured to determine the first reduced transmission power $P_{CMAX,c,1}$ in consideration of a first minimum min(MPR) that may be a minimum of the Maximum Power Reductions MPR, a second minimum min(AMPR) that may be a minimum of the Additional Maximum Power Reductions AMPR, a Power Management Maximum Power Reduction PMPR and the nominal maximum transmission power $Ptx_{max,nominal}$ of the selected transmission circuit by a formula (5):

$$P_{CMAX,c,1}=Ptx_{max,nominal}-\max(\min(MPR+AMPR), PMPR). \quad (5)$$

Further, the baseband circuit 202 may be configured to select a preamble group from a plurality of preamble groups that may be preamble groups of the Physical Random Access Channel based on the determined first reduced transmission power $P_{CMAX,c,1}$.

Moreover, the baseband circuit 202 may be configured to transmit a preamble signal including the preamble of the selected preamble group to the base station 106.

The base station 106 may be configured to transmit uplink grant signal to the first mobile wireless device 102 which may imply a certain required power of a Message Three based on the LTE communication technology.

Figure 7:
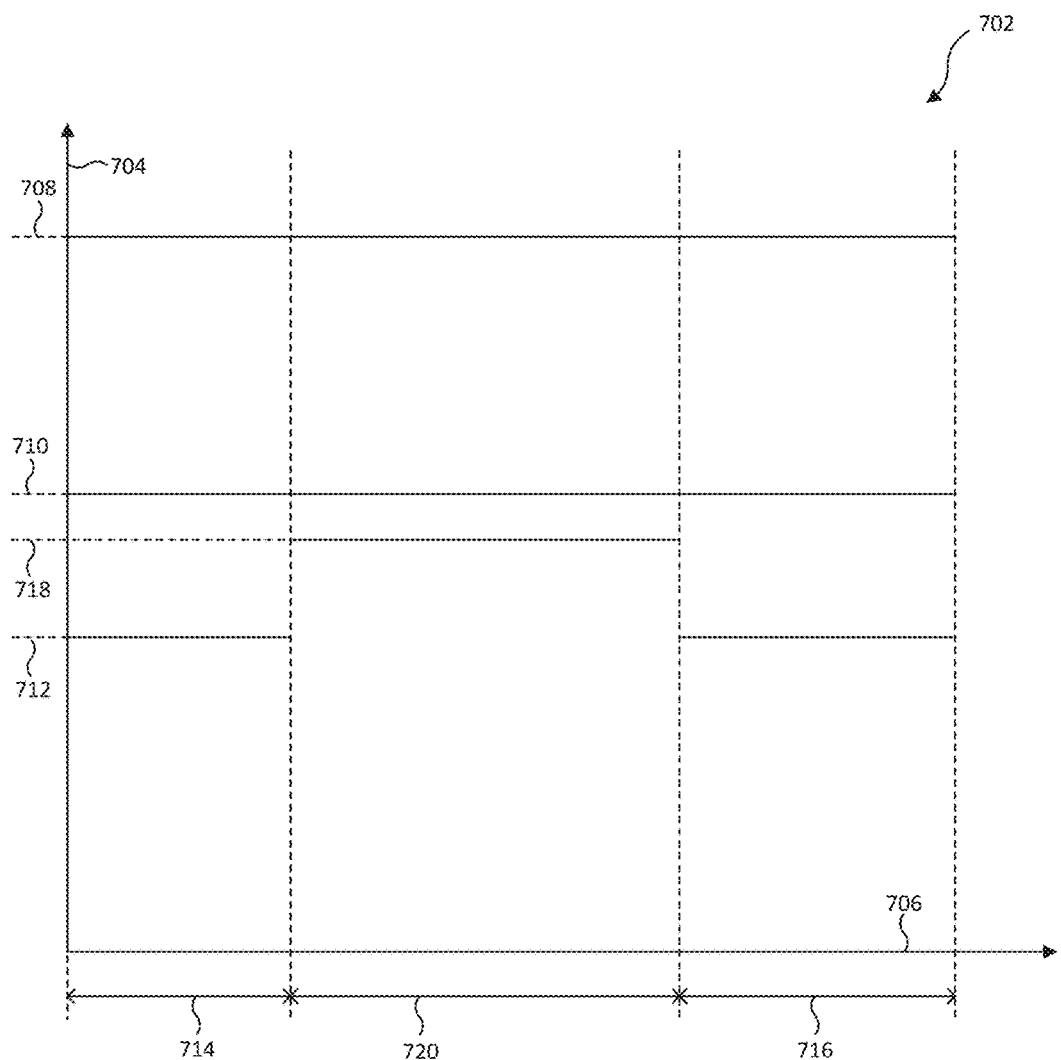
FIG. 7 is a schematic diagram that shows a first reduced transmission power of the first mobile wireless device random access procedure.

FIG. 7 is an exemplary schematic diagram 702 that shows the first reduced transmission power $P_{CMAX,c,1}$ of the first mobile wireless device 102 in the random access procedure with respect to transmission frequencies. The diagram 702 may have a first axis 704 that may indicate transmission powers of the transmission circuits of the first mobile wireless device 102 and a second axis 706 that may indicate transmission frequencies of the transmission of radio signals.

The selected transmission circuit may have a determined maximum transmission power $P_{CMAX,c}$ that may be referenced by the reference numeral 708. Further, the selected transmission circuit may have a first reduced transmission power $P_{CMAX,c,1}$ that may be referenced by the reference numeral 710.

Moreover, the baseband circuit 202 may be configured to determine an actual maximum transmission power $P_{CMAX,c,actual}$ based on a frequency range information of the base station 106 in consideration of an actual Maximum Power Reduction $MPR_{actual}$ that may be associated with a frequency range of the frequency range information and an actual Additional Maximum Power Reduction $AMPR_{actual}$ that may be associated with the frequency range of the frequency range information by a formula (6):

$$P_{CMAX,c,actual}=Ptx_{max,nominal}-\max(MPR_{actual}+AMPR_{actual},PMPR) \quad (6)$$

The actual maximum transmission power $P_{CMAX,c,actual}$ may have a first power 712 in a first frequency range 714 and a second frequency range 716 and a second power 718 in a third frequency range 720.

Further, the first reduced transmission power $P_{CMAX,c,1}$ may be closer to the actual determined maximum transmission power $P_{CMAX,c,actual}$ than the determined maximum transmission power $P_{CMAX,c}$ so that the baseband circuit 202 may be configured to select an accurate preamble group from the plurality of preamble groups.

Figure 8:
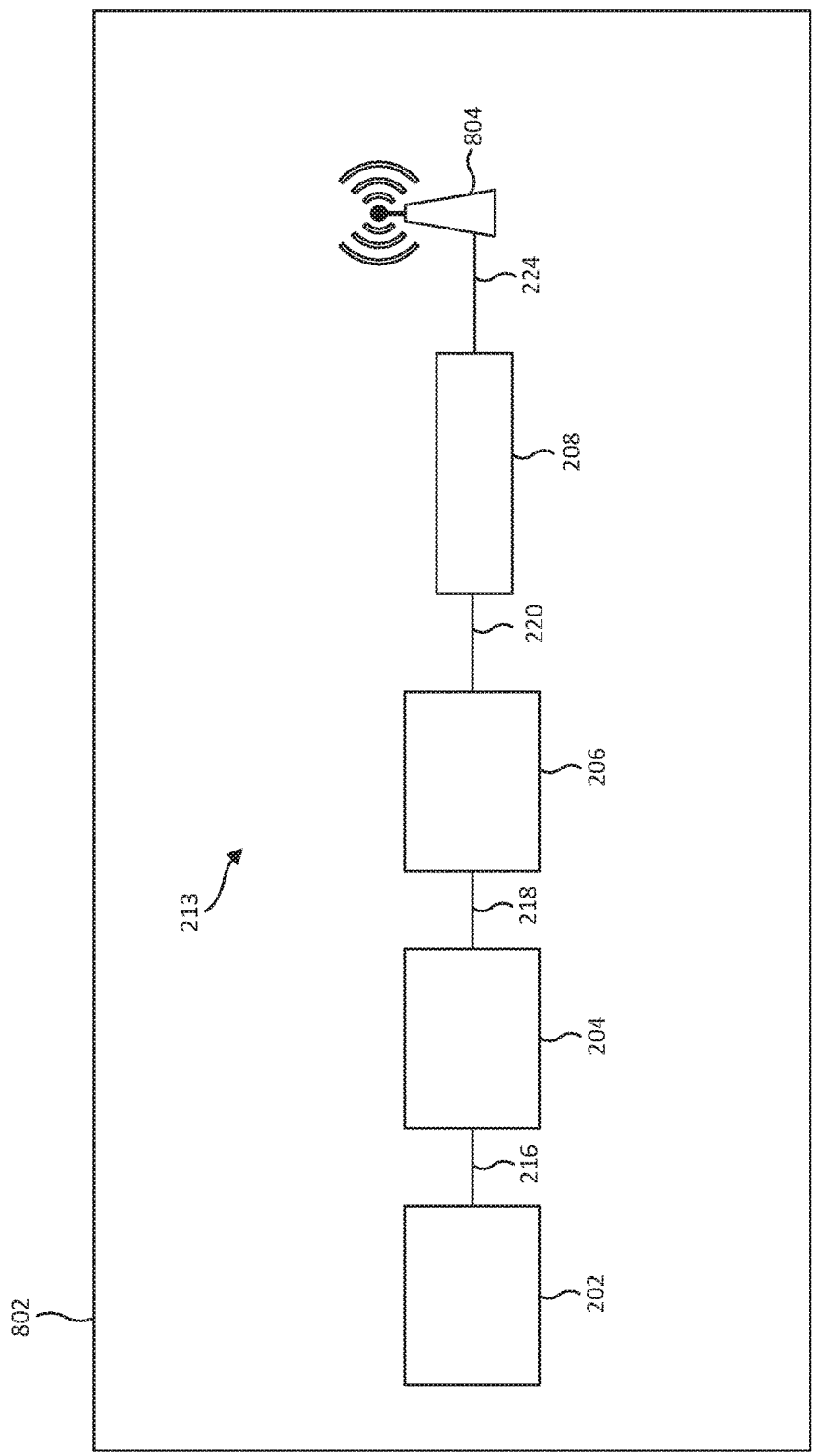
FIG. 8 shows a schematic drawing of a second mobile wireless device according to an example.

FIG. 8 shows a schematic drawing of a second mobile wireless device 802 according to an example. Features of the example of FIG. 8 that correspond to those of the example of FIG. 1 to FIG. 7 are indicated by the same reference numerals. The second mobile wireless device 802 may include the baseband circuit 202, the transceiver circuit 204, the radio front end circuit 206, the first front end path circuit 208 instead of the two front end path circuits 208 and 210 and an antenna 804 instead of the two antennas 212 and 214. The antenna 804 may be configured to transmit and to receive radio signals.

Further, the antenna 804 may be configured to receive at least one frequency range allocation information signal of a random access procedure and to transmit the frequency range allocation information signal to the baseband circuit 202. The baseband circuit 202 of the second mobile wireless device 802 may be configured to store the at least one frequency range allocation information and to determine an anticipation information. The anticipation information may include a frequency range information of an anticipated frequency range of the plurality of frequency ranges based on the stored at least one frequency range allocation information. In an example, the baseband circuit 202 may be configured to determine the anticipated frequency range to be the most frequently received frequency range.

Further, the baseband circuit 202 may be configured to determine a second reduced transmission power $P_{CMAX,c,2}$ of the first transmission circuit 213 in consideration of the nominal maximum transmission power $Ptx_{max,nominal}$ of the first transmission circuit, an anticipated Maximum Power Reduction $MPR_{anticipated}$ that may be associated with the anticipated frequency range, an anticipated Additional Maximum Power Reduction $MPR_{anticipated}$ that may be associated with the anticipated frequency range and the Power Management Maximum Power Reduction PMPR by a formula (7):

$$P_{CMAX,c,2}=Ptx_{max,nominal}-\max(MPR_{anticipated}+AMPR_{anticipated},PMPR). \quad (7)$$

All other aspects of the second mobile wireless device of FIG. 8 may correspond to aspects of the first mobile wireless device of FIG. 1 to FIG. 7.

Figure 9:
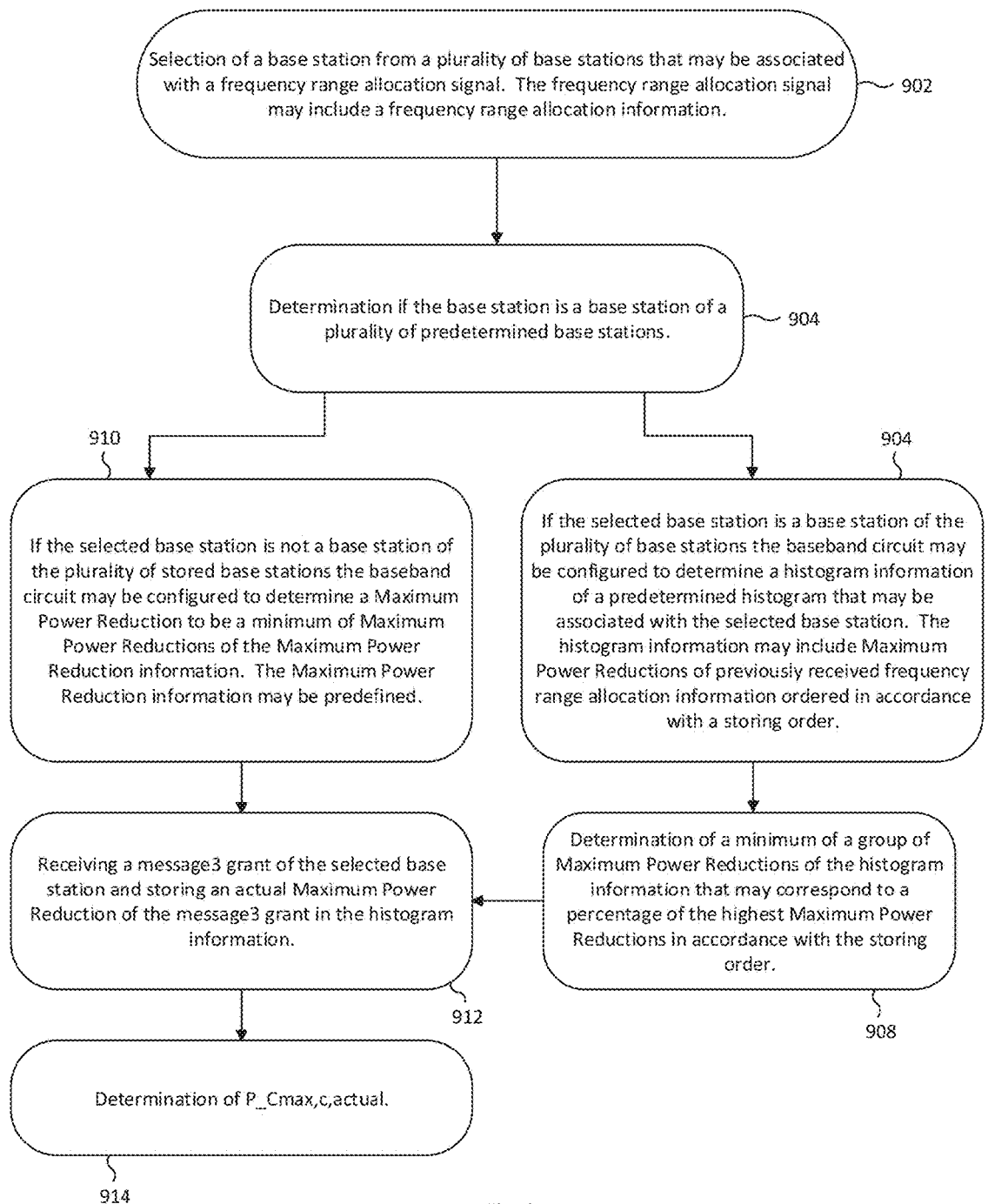
FIG. 9 shows a flow diagram of a preamble group selection based on the anticipation information of the mobile wireless device of the examples of FIG. 1 to FIG. 8.

FIG. 9 shows a flow diagram of a preamble group selection based on the anticipation information of the mobile wireless device of the examples of FIG. 1 to FIG. 8.

In 902, the baseband circuit 202 may be configured to select a base station from a plurality of base stations that may be associated with a frequency range allocation signal. The frequency range allocation signal may include a frequency range allocation information.

In 904, the baseband circuit 202 may be configured to determine if the base station is a base station of a plurality of predetermined base stations.

In 906, if the selected base station is a base station of the plurality of base stations the baseband circuit 202 may be configured to determine a histogram information of a predetermined histogram that may be associated with the selected base station. The histogram information may include Maximum Power Reductions of previously received frequency range allocation information ordered in accordance with a storing order.

In 908, the baseband circuit 202 may be configured to determine a minimum of a group of Maximum Power Reductions of the histogram information that may correspond to a percentage of the highest Maximum Power Reductions in accordance with the storing order.

In 910, if the selected base station is not a base station of the plurality of stored base stations the baseband circuit 202 may be configured to determine a Maximum Power Reduction to be a minimum of Maximum Power Reductions of the Maximum Power Reduction information. The Maximum Power Reduction information may be predefined.

In 912, the baseband circuit 202 may be configured to receive a message3 grant of the selected base station and to store an actual Maximum Power Reduction of the message3 grant in the histogram information.

In 914, the baseband circuit 202 may be configured to determine $P_{CMAX,c,actual}$ based on formula (6).

Figure 10:
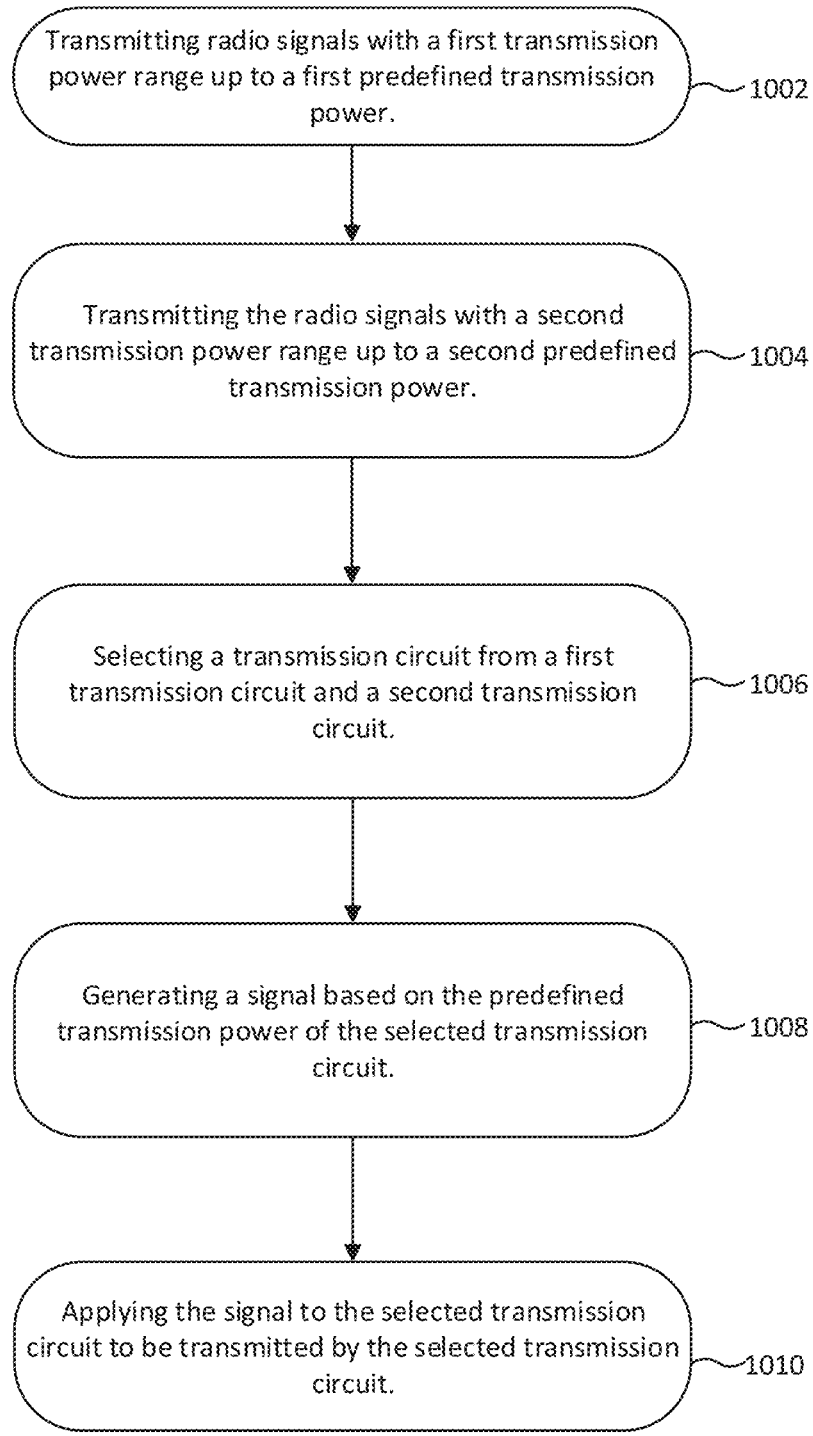
FIG. 10 shows a first method for performing radio communication.

FIG. 10 shows a first method for performing radio communication. The first method may include, in 1002, transmitting radio signals with a first transmission power range up to a first predefined transmission power.

The first method may further include, in 1004, transmitting the radio signals with a second transmission power range up to a second predefined transmission power.

The first method may further include, in 1006, selecting a transmission circuit from a first transmission circuit and a second transmission circuit.

The first method may further include, in 1008, generating a signal based on the predefined transmission power of the selected transmission circuit.

The first method may further include, in 1010, applying the signal to the selected transmission circuit to be transmitted by the selected transmission circuit.

Figure 11:
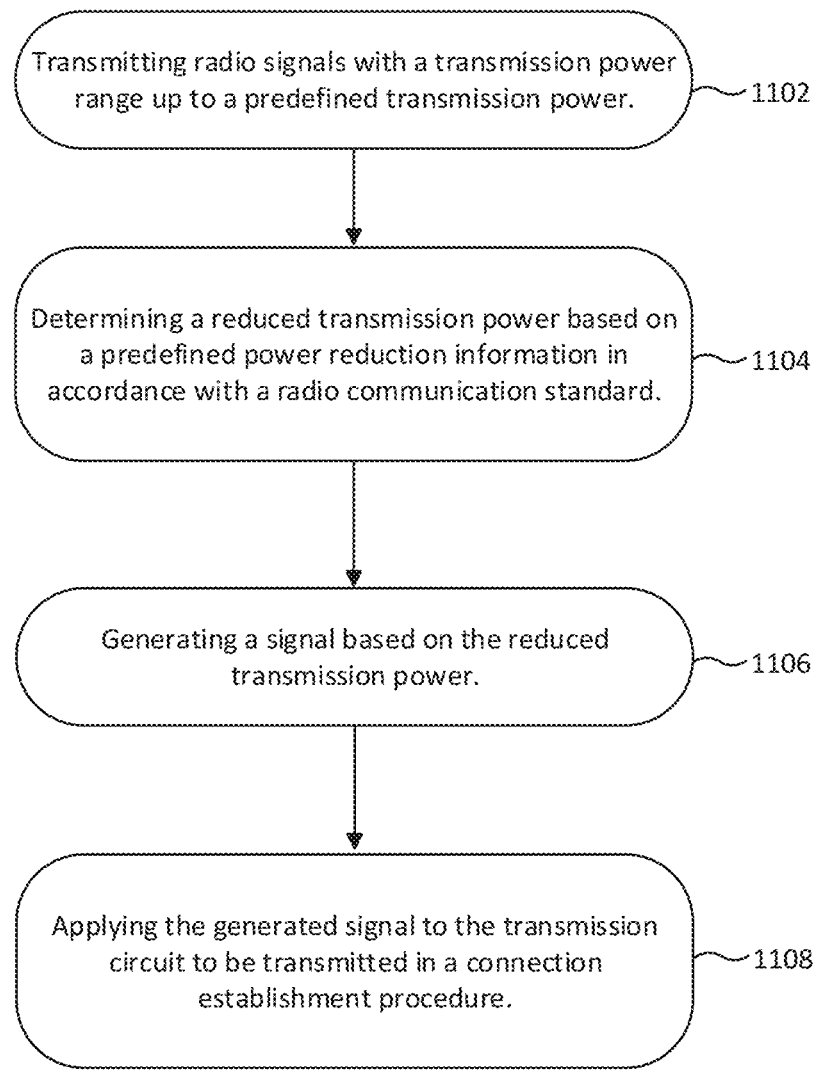
FIG. 11 shows a second method for performing radio communication.

FIG. 11 shows a second method for performing radio communication. The second method may include, in 1102, transmitting radio signals with a transmission power range up to a predefined transmission power.

The second method may further include, in 1104, determining a reduced transmission power based on a predefined power reduction information in accordance with a radio communication technology.

The second method may further include, in 1106, generating a signal based on the reduced transmission power.

The second method may further include, in 1108, applying the generated signal to the transmission circuit to be transmitted in a random access procedure.

Figure 12:
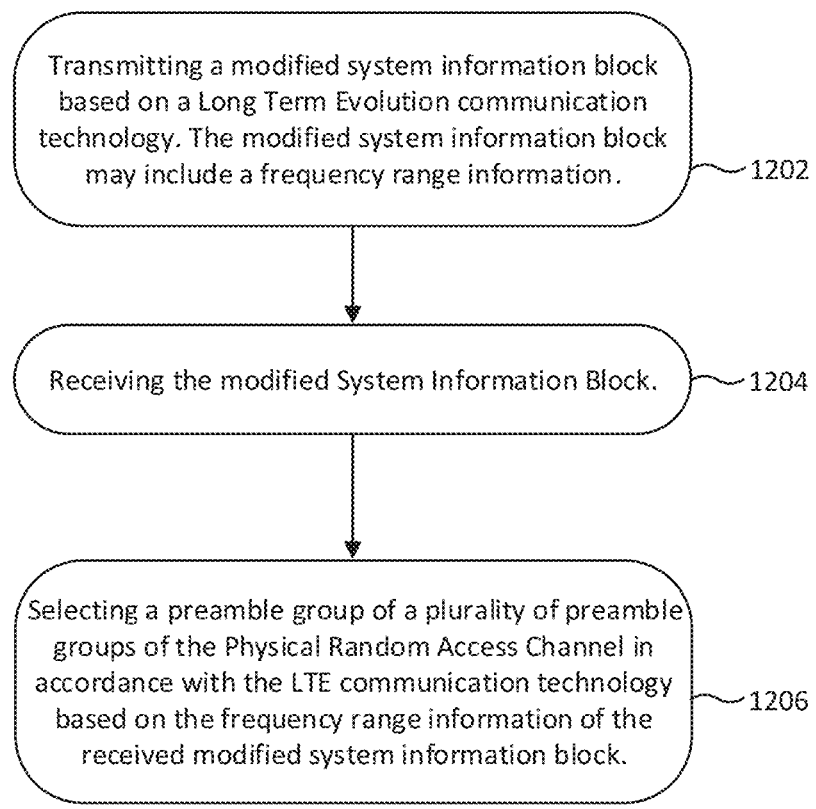
FIG. 12 shows a third method for performing radio communication.

FIG. 12 shows a third method for performing radio communication. The method may include, in 1202, transmitting a modified system information block based on a Long Term Evolution communication technology. The modified system information block may include a frequency range information.

The third method may further include, in 1204, receiving the modified system information block.

The third method may further include, in 1206, selecting a preamble group of a plurality of preamble groups of the Physical Random Access Channel in accordance with the LTE communication technology based on the frequency range information of the received modified system information block.

It should be noted that aspects described in the context of the mobile wireless devices according to the examples of FIG. 1 to FIG. 9 are analogously valid for the methods that are illustrated based on FIG. 10 to FIG. 12.

In an example, the communication device may be configured in accordance with a Long Term Evolution communication technology.

In an example, the first transmission circuit and the second transmission circuit may be configured to modulate the signal. Further, the application of the signal to the selected transmission circuit may include a modulation of the signal by the selected transmission circuit.

In an example, the first predefined transmission power is a first maximum transmission power of the first transmission circuit. Further, the second predefined transmission power is a second maximum transmission power of the second transmission circuit. Thus, the baseband circuit may be configured to apply the signal to be transmitted with an actual maximum transmission power that may lower than a target transmission power.

In an example, the baseband circuit may be configured to determine the first maximum transmission power in a configuration phase of the communication device based on a measurement of the maximum of the transmission power of the first transmission circuit and the second maximum transmission power in the configuration phase based on a measurement of a maximum of the transmission power of the second transmission circuit. Thus, the baseband circuit may be configured to determine a maximum transmission power in consideration of all power losses.

In an example, the baseband circuit may be configured to determine a Pcmax,c information of the Long Term Evolution communication technology based on a substitution of a Ppowerclass information of a radio mobile communication technology by the maximum transmission power of the selected transmission circuit. Thus, the communication device may be configured to communicate reliably and efficiently. In an example the radio mobile communication technology may be the Long Term Evolution communication technology.

In an example, the baseband circuit may be configured to determine a reduced transmission power information that may include a reduced transmission power of the selected transmission circuit based on a Maximum Power Reduction information and an Additional Maximum Power Reduction information. Further, the Maximum Power Reduction information may include Maximum Power Reductions of a plurality of Maximum Power Reductions in accordance with the Long Term Evolution communication technology that may be associated with frequency ranges of a plurality of frequency ranges. Moreover, the Additional Maximum Power Reduction information may include Additional Maximum Power Reductions of a plurality of Additional Maximum Power Reductions in accordance with the Long Term Evolution communication technology that may be associated with the frequency ranges of the plurality of frequency ranges.

In an example, the reduced transmission power is a first reduced transmission power and the reduced transmission power information is a first reduced transmission power information. Further, the baseband circuit may be configured to determine the first reduced transmission power in consideration of a first minimum that is a minimum of the Maximum Power Reductions, a second minimum that is a minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power of the selected transmission circuit. Further, the basebands circuit may be configured to generate the signal based on the first reduced transmission power information. Thus, the communication device may be configured to establish connections reliably and efficiently.

In an example, the reduced transmission power is a second reduced transmission power and the reduced transmission power information is a second reduced transmission power information. Further, the communication device may further include a receiver configured to receive at least one frequency range allocation information. Moreover, the baseband circuit may be configured to store the at least one frequency range allocation information and to determine an anticipation information that may include a frequency range information of an anticipated frequency range of the plurality of frequency ranges based on the stored frequency range allocation information. Further, the baseband circuit may be configured to determine the second reduced transmission power of the selected transmission circuit in a random access procedure in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the maximum from the predefined transmission power of the selected transmission circuit.

Further, the baseband circuit may be configured to generate the signal based on the second reduced transmission power information. Thus, the communication device may be configured to communicate in a random access procedure reliably and efficiently.

In an example, the reduced transmission power is a third reduced transmission power and the reduced transmission power information is a third reduced transmission power information. Further, the communication device may further include a receiver configured to receive a frequency range allocation information. Further, the baseband circuit may be configured to select a Maximum Power Reduction of the Maximum Power Reduction information based on the received frequency range allocation information, that may for example be based on a modified system information block, and to select an Additional Maximum Power Reduction of the Additional Maximum Power Reduction information based on the received frequency range allocation information. Moreover, the baseband circuit may be configured to determine the third reduced transmission power of the selected transmission circuit in a random access procedure in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the selected transmission circuit. Further, the baseband circuit may be configured to generate the signal based on the third reduced transmission power information. Thus, the communication device may be configured to communicate in a reliable and effective manner.

In an example, the baseband circuit may be configured to determine the $P_{cmax,c}$ information, in case of a random access procedure, based on the Long Term Evolution communication technology to be at least one of the first reduced transmission power, the second reduced transmission power or the third reduced transmission power. Thus, the baseband circuit may be configured to base all communication technology related determinations on a reliable value.

In an example, at least one of the first predefined transmission power or the second predefined transmission power may be smaller than a transmission power of a User Equipment Power Class in accordance with the LTE communication technology.

In an example, the signal may include a power headroom information. Thus, the communication device may communicate in a reliable manner.

In an example, the power headroom information may be a Power Headroom Report in accordance with the Long Term Evolution communication technology. Thus, the communication device may be configured to communicate in a radio communication technology conforming manner.

In an example, the communication device may include a plurality of transmission circuits. Further, the first transmission circuit and the second transmission circuit are transmission circuits of the plurality of transmission circuits. Moreover, the transmission circuits may be configured to transmit radio signals with transmission power ranges up to transmission powers of a plurality of predefined transmission powers, respectively. Further, the baseband circuit may be configured to select the transmission circuit from the plurality of transmission circuits.

In an example, the baseband circuit may be configured to select a preamble group from a plurality of preamble groups of a Physical Random Access Channel in accordance with the Long Term Evolution communication technology based on at least one of the maximum transmission power of the selected transmission circuit, the first reduced transmission power, the second reduced transmission power or the third reduced transmission power. Further, the signal may include a preamble of the selected preamble group. Thus, the communication device may be configured to efficiently communicate in a radio resource control connection establishment.

Various aspects of this disclosure provide a communication device that may include a transmission circuit configured to transmit radio signals with a transmission power range up to a predefined transmission power. Further, the communication device may include a baseband circuit configured to determine a reduced transmission power based on a predefined power reduction information in accordance with a mobile radio communication technology. The baseband circuit may be configured to generate a signal based on the reduced transmission power and to apply the generated signal to the transmission circuit to be transmitted in a random access procedure. Thus, the communication device may be configured to efficiently and reliably communicate in a random access procedure.

In an example, the radio communication technology may be a Long Term Evolution communication standard.

In an example, the first transmission circuit and the second transmission circuit may be configured to modulate the signal. Further, the application of the signal to the selected transmission circuit may include a modulation of the signal by the selected transmission circuit. Thus, the communication device may be configured to efficiently transmit outgoing signals.

In an example, the predefined power reduction information may include a Maximum Power Reduction information and an Additional Maximum Power Reduction information. The Maximum Power Reduction information may include Maximum Power Reductions of a plurality of Maximum Power Reductions that may be associated with frequency ranges of a plurality of frequency ranges. The Additional Maximum Power Reduction information may include Additional Maximum Power Reductions of a plurality of Additional Maximum Power Reductions that may be associated with the frequency ranges of the plurality of frequency ranges.

In an example, the baseband circuit may be configured to determine the reduced transmission power in consideration of a first minimum of the Maximum Power Reductions, a second minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power. Thus, the communication device may be configured to transmit reliable and accurate information in the random access procedure.

In an example, the communication device may further include a receiver configured to receive at least one frequency range allocation information. Further, the baseband circuit may be configured to store the at least one frequency range allocation information and to determine an anticipation information that may include a frequency range information of an anticipated frequency range of the plurality of frequency ranges based on the stored at least one frequency range allocation information. Moreover, the baseband circuit may be configured to determine the reduced transmission power of the transmission circuit in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the sum from the predefined transmission power of the transmission circuit. Thus, the communication device may be configured to provide accurate and reliable information in the random access procedure.

In an example, the communication device may further include a receiver configured to receive a frequency range allocation information. Further, the baseband circuit may be configured to select a Maximum Power Reduction of the Maximum Power Reduction information based on the received frequency range allocation information and to select an Additional Maximum Power Reduction of the Additional Maximum Power Reduction information based on the received frequency range allocation information. Moreover, the baseband circuit may be configured to determine the reduced transmission power of the transmission circuit in consideration of a sum of the selected Maximum Power Reduction and the selected Additional Maximum Power Reduction and a maximum of the sum and the Power Management Maximum Power Reduction in accordance with the Long Term Evolution communication technology by a subtraction of the maximum from the predefined transmission power of the transmission circuit. Thus, the communication device may be configured to communicate effectively and efficiently in the random access procedure.

In an example, the baseband circuit may be configured to determine the Pcmax,c information of the Long Term Evolution communication technology to be the reduced transmission power. Thus, the communication device may be configured to determine accurate information as basis for radio communication.

In an example, the baseband circuit may be configured to select a preamble group from a plurality of preamble groups of a Physical Random Access Channel in accordance with the Long Term Evolution communication technology based on the reduced transmission power. Further, the signal may include a preamble of the selected preamble group. Thus, the communication device may be configured to provide accurate information in the connection equalization procedure. Further, the communication device may be configured to communicate in effective manner.

In an example, the random access procedure may be a connection establishment procedure.

In an example, the random access procedure is contention-based.

Furthermore, a method for performing radio communication radio communication may be provided that may include transmitting radio signals with a first transmission power range up to a first predefined transmission power. Further, the method may include transmitting the radio signals with a second transmission power range up to a second predefined transmission power. Moreover, the method may include selecting a transmission circuit from a first transmission circuit and a second transmission circuit. Further, the method may include generating a signal based on the predefined transmission power of the selected transmission circuit. Moreover, the method may include applying the signal to the selected transmission circuit to be transmitted by the selected transmission circuit.

Furthermore, a method for performing radio communication may be provided that may include transmitting radio signals with a transmission power range up to a predefined transmission power. Further, the method may include determining a reduced transmission power based on a predefined power reduction information in accordance with a mobile radio communication technology. Moreover, the method may include generating a signal based on the reduced transmission power. Further, the method may include applying the generated signal to the transmission circuit to be transmitted in a random access procedure.

Furthermore, a method for performing radio communication may be provided that may include transmitting a modified system information block based on a Long Term Evolution communication technology. The modified system information block may include a frequency range. Further, the method may include receiving the modified system information block. Moreover, the method may include generating a signal that may include a maximum transmission power information based on the frequency range of the received modified system information block. Thus, a random access procedure may be effective and reliable.

In an example, the modified system information block may include a network signaling value that may indicate frequency allocation information based on the Long Term Evolution communication technology. There may be a special value to indicate that no information is provided by the modified system information block.

It should be noted that aspects described in the context of the previous examples may be analogously valid for the above provided methods.

In the following, various aspects of this disclosure will be illustrated:

Example 1 is a communication device that may include a first transmission circuit configured to transmit radio signals with a first transmission power range up to a first predefined transmission power, a second transmission circuit configured to transmit the radio signals with a second transmission power range up to a second predefined transmission power and a baseband circuit configured to select a transmission circuit from the first transmission circuit and the second transmission circuit and to generate a signal based on the predefined transmission power of the selected transmission circuit. The baseband circuit may be configured to apply the signal to the selected transmission circuit to be transmitted by the selected transmission circuit.

In Example 2, the subject matter of Example 1 can optionally include the communication device may be configured in accordance with a Long Term Evolution communication technology.

In Example 3, the subject matter of any one of Examples 1 to 2 can optionally include that the first transmission circuit and the second transmission circuit may be configured to modulate the signal. Applying the signal to the selected transmission circuit may include a modulation of the signal by the selected transmission circuit.

In Example 4, the subject matter of any one of Examples 1 to 3 can optionally include that the first predefined transmission power may be a first maximum transmission power of the first transmission circuit. The second predefined transmission power may be a second maximum transmission power of the second transmission circuit.

In Example 5, the subject matter of Example 4 can optionally include that the baseband circuit may be configured to determine the first maximum transmission power in a configuration phase of the communication device based on a measurement of the maximum of the transmission power of the first transmission circuit and the second maximum transmission power in the configuration phase based on a measurement of a maximum of the transmission power of the second transmission circuit.

In Example 6, the subject matter of any one of Examples 4 to 5 can optionally include that the baseband circuit may be configured to determine a Pcmax,c information of the Long Term Evolution communication technology based on a substitution of a Ppowerclass information of a radio mobile communication technology by the maximum transmission power of the selected transmission circuit.

In Example 7, the subject matter of any one of Examples 1 to 5 can optionally include that the baseband circuit may be configured to determine a reduced transmission power information that may include a reduced transmission power of the selected transmission circuit based on a Maximum Power Reduction information and an Additional Maximum Power Reduction information. The Maximum Power Reduction information may include Maximum Power Reductions of a plurality of Maximum Power Reductions in accordance with the Long Term Evolution communication technology that may be associated with frequency ranges of a plurality of frequency ranges. The Additional Maximum Power Reduction information may include Additional Maximum Power Reductions of a plurality of Additional Maximum Power Reductions in accordance with the Long Term Evolution communication technology that may be associated with the frequency ranges of the plurality of frequency ranges.

In Example 8, the subject matter of Examples 7 can optionally include that the reduced transmission power may be a first reduced transmission power and the reduced transmission power information may be a first reduced transmission power information. The baseband circuit may be configured to determine the first reduced transmission power in consideration of a first minimum that may be a minimum of the Maximum Power Reductions, a second minimum that may be a minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power of the selected transmission circuit. The baseband circuit may be configured to generate the signal based on the first reduced transmission power information.

In Example 9, the subject matter of Example 7 can optionally include that the communication device may further include a receiver configured to receive at least one frequency range allocation information. The reduced transmission power may be a second reduced transmission power and the reduced transmission power information may be a second reduced transmission power information. The baseband circuit may be configured to store the at least one frequency range allocation information and to determine an anticipation information that may include a frequency range information of an anticipated frequency range of the plurality of frequency ranges based on the stored frequency range allocation information. The baseband circuit may be configured to determine the second reduced transmission power of the selected transmission circuit in a random access procedure in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the maximum from the predefined transmission power of the selected transmission circuit. The baseband circuit may be configured to generate the signal based on the second reduced transmission power information.

In Example 10, the subject matter of Example 7 can optionally include that the communication device may further include a receiver configured to receive a frequency range allocation information. The reduced transmission power may be a third reduced transmission power and the reduced transmission power information may be a third reduced transmission power information. The baseband circuit may be configured to select a Maximum Power Reduction of the Maximum Power Reduction information based on the received frequency range allocation information and to select an Additional Maximum Power Reduction of the Additional Maximum Power Reduction information based on the received frequency range allocation information. The baseband circuit may be configured to determine the third reduced transmission power of the selected transmission circuit in a random access procedure in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the selected transmission circuit. The baseband circuit may be configured to generate the signal based on the third reduced transmission power information.

In Example 11, the subject matter of any one of Examples 8 to 10 can optionally include that the baseband circuit may be configured to determine the Pcmax,c information of the Long Term Evolution communication technology to be at least one of the first reduced transmission power, the second reduced transmission power or the third reduced transmission power.

In Example 12, the subject matter of any one of Examples 1 to 11 can optionally include that at least one of the first predefined transmission power or the second predefined transmission power may be smaller than a transmission power of a user equipment power class in accordance with the Long Term Evolution communication technology.

In Example 13, the subject matter of any one of Examples 1 to 6 can optionally include that the signal may include a power headroom information.

In Example 14, the subject matter of any one of Examples 1 to 6 can optionally include that the communication device may further include a plurality of transmission circuits. The first transmission circuit and the second transmission circuit may be transmission circuits of the plurality of transmission circuits. The transmission circuits may be configured to transmit radio signals with transmission power ranges up to transmission powers of a plurality of predefined transmission powers, respectively. The baseband circuit may be configured to select the transmission circuit from the plurality of transmission circuits.

In Example 15, the subject matter of any one of Examples 13 to 14 can optionally include that the power headroom information may be a Power Headroom Report in accordance with the Long Term Evolution communication technology.

In Example 16, the subject matter of any one of Examples 4 to 12 can optionally include that the baseband circuit may be configured to select a preamble group from a plurality of preamble groups of a Physical Random Access Channel in accordance with the Long Term Evolution communication technology based on at least one of the maximum transmission power of the selected transmission circuit, the first reduced transmission power, the second reduced transmission power or the third reduced transmission power. The signal may include a preamble of the selected preamble group.

In Example 17, the subject matter of any one of Examples 1 to 16 can optionally include that the second predefined transmission power may be different from the first predefined transmission power.

Example 18 is a communication device. The communication device may include a transmission circuit configured to transmit radio signals with a transmission power range up to a predefined transmission power and a baseband circuit configured to determine a reduced transmission power based on a predefined power reduction information in accordance with a radio communication technology. The baseband circuit may be configured to generate a signal based on the reduced transmission power and to apply the generated signal to the transmission circuit to be transmitted in a random access procedure.

In Example 19, the subject matter of Example 18 can optionally include that the radio communication technology may be a Long Term Evolution communication standard.

In Example 20, the subject matter of any one of Examples 18 to 19 can optionally include that the first transmission circuit and the second transmission circuit may be configured to modulate the signal. The application of the signal to the selected transmission circuit may include a modulation of the signal by the selected transmission circuit.

In Example 21, the subject matter of any one of Examples 18 to 20 can optionally include that the predefined power reduction information may include a Maximum Power Reduction information and an Additional Maximum Power Reduction information. The Maximum Power Reduction information may include Maximum Power Reductions of a plurality of Maximum Power Reductions that may be associated with frequency ranges of a plurality of frequency ranges. The Additional Maximum Power Reduction information may include Additional Maximum Power Reductions of a plurality of Additional Maximum Power Reductions that may be associated with the frequency ranges of the plurality of frequency ranges.

In Example 22, the subject matter of Example 21 can optionally include that the baseband circuit may be configured to determine the reduced transmission power in consideration of a first minimum of the Maximum Power Reductions, a second minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power.

In Example 23, the subject matter of Example 21 can optionally include that the communication device may include a receiver configured to receive at least one frequency range allocation information. The baseband circuit may be configured to store the at least one frequency range allocation information and to determine an anticipation information that may include a frequency range information of an anticipated frequency range of the plurality of frequency ranges based on the stored at least one frequency range allocation information. The baseband circuit may be configured to determine the reduced transmission power of the transmission circuit in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the maximum from the predefined transmission power of the transmission circuit.

In Example 24, the subject matter of Example 21 can optionally include that the communication device may further include a receiver configured to receive a frequency range allocation information. The baseband circuit may be configured to select a Maximum Power Reduction of the Maximum Power Reduction information based on the received frequency range allocation information and to select an Additional Maximum Power Reduction of the Additional Maximum Power Reduction information based on the received frequency range allocation information. The baseband circuit may be configured to determine the reduced transmission power of the transmission circuit in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the transmission circuit.

In Example 25, the subject matter of any one of Examples 18 to 24 can optionally include that the baseband circuit may be configured to determine the Pcmax,c information of the Long Term Evolution communication technology to be the reduced transmission power.

In Example 26, the subject matter of any one of Examples 18 to 25 can optionally include that the baseband circuit may be configured to select a preamble group from a plurality of preamble groups of a Physical Random Access Channel in accordance with the Long Term Evolution communication technology based on the reduced transmission power. The signal may include a preamble of the selected preamble group.

In Example 27, the subject matter of any one of Examples 18 to 26 can optionally include that the random access procedure may be a connection establishment procedure.

In Example 28, the subject matter of Example 27 can optionally include that the random access procedure may be contention-based.

In Example 29, the subject matter of any one of Examples 1 to 27 can optionally include that the second predefined transmission power is different from the first predefined transmission power.

Example 30 is a method for performing radio communication radio communication that may include transmitting radio signals with a first transmission power range up to a first predefined transmission power, transmitting the radio signals with a second transmission power range up to a second predefined transmission power that may be different from the first predefined transmission power, selecting a transmission circuit from a first transmission circuit and a second transmission circuit, generating a signal based on the predefined transmission power of the selected transmission circuit and applying the signal to the selected transmission circuit to be transmitted by the selected transmission circuit.

In Example 31, the subject matter of Example 30 can optionally include that the signal may be configured in accordance with a Long Term Evolution communication technology.

In Example 32, the subject matter of any one of Examples 30 to 31 can optionally include that the method may further include modulating the signal. The application of the signal to the selected transmission circuit may include a modulation of the signal by the selected transmission circuit.

In Example 33, the subject matter of any one of Examples 30 to 32 can optionally include that the first predefined transmission power may be a first maximum transmission power of the first transmission circuit. The second predefined transmission power may be a second maximum transmission power of the second transmission circuit.

In Example 34, the subject matter of Example 33 can optionally include that the method may further include determining the first maximum transmission power in a configuration phase of the method based on a measurement of the maximum of the transmission power of the first transmission circuit and the second maximum transmission power in the configuration phase based on a measurement of a maximum of the transmission power of the second transmission circuit.

In Example 35, the subject matter of any one of Examples 33 to 34 can optionally include that the method may further include determining a Pcmax,c information of the Long Term Evolution communication technology based on a substitution of a Ppowerclass information of a radio mobile communication technology by the maximum transmission power of the selected transmission circuit.

In Example 36, the subject matter of any one of Examples 30 to 34 can optionally include that the method may further include determining a reduced transmission power information that may include a reduced transmission power of the selected transmission circuit based on a Maximum Power Reduction information and an Additional Maximum Power Reduction information. The Maximum Power Reduction information may include Maximum Power Reductions of a plurality of Maximum Power Reductions in accordance with the Long Term Evolution communication technology that may be associated with frequency ranges of a plurality of frequency ranges. The Additional Maximum Power Reduction information may include Additional Maximum Power Reductions of a plurality of Additional Maximum Power Reductions in accordance with the Long Term Evolution communication technology that may be associated with the frequency ranges of the plurality of frequency ranges.

In Example 37, the subject matter of Example 36 can optionally include that the reduced transmission power may be a first reduced transmission power and the reduced transmission power information may be a first reduced transmission power information. The method may further include determining the first reduced transmission power in consideration of a first minimum that may be a minimum of the Maximum Power Reductions, a second minimum that may be a minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power of the selected transmission circuit. The signal may include the first reduced transmission power information.

In Example 38, the subject matter of Example 36 can optionally include that the reduced transmission power may be a second reduced transmission power and the reduced transmission power information may be a second reduced transmission power information. The method may further include receiving at least one frequency range allocation information, storing the at least one frequency range allocation information, determining an anticipation information that may include a frequency range information of an anticipated frequency range of the plurality of frequency ranges based on the stored frequency range allocation information. The method may further include determining the second reduced transmission power of the selected transmission circuit in a random access procedure in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the maximum from the predefined transmission power of the selected transmission circuit. The signal may include the second reduced transmission power information.

In Example 39, the subject matter of Example 36 can optionally include that the reduced transmission power may be a third reduced transmission power and the reduced transmission power information may be a third reduced transmission power information. The method may further include receiving a frequency range allocation information, selecting a Maximum Power Reduction of the Maximum Power Reduction information based on the received frequency range allocation information, selecting an Additional Maximum Power Reduction of the Additional Maximum Power Reduction information based on the received frequency range allocation information and determining the third reduced transmission power of the selected transmission circuit in a random access procedure in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the selected transmission circuit. The signal may include the third reduced transmission power information.

In Example 40, the subject matter of any one of Examples 37 to 39 can optionally include that the method may further include determining the Pcmax,c information of the Long Term Evolution communication technology to be at least one of the first reduced transmission power, the second reduced transmission power or the third reduced transmission power.

In Example 41, the subject matter of any one of Examples 27 to 37 can optionally include that at least one of the first predefined transmission power or the second predefined transmission power may be smaller than a transmission power of a user equipment power class in accordance with the Long Term Evolution communication technology.

In Example 42, the subject matter of any one of Examples 30 to 35 can optionally include that the signal may include a power headroom information.

In Example 43, the subject matter of any one of Examples 30 to 42 can optionally include that the method may further include transmitting radio signals with transmission power ranges up to transmission powers of a plurality of predefined transmission powers, respectively and selecting the transmission circuit from the plurality of transmission circuits. The first transmission circuit and the second transmission circuit may be transmission circuits of a plurality of transmission circuits.

In Example 44, the subject matter of any one of Examples 42 to 43 can optionally include that the power headroom information may be a Power Headroom Report in accordance with the Long Term Evolution communication technology.

In Example 45, the subject matter of any one of Examples 33 to 41 can optionally include that the method may further include selecting a preamble from a plurality of preambles of a Physical Random Access Channel in accordance with the Long Term Evolution communication technology based on at least one of the maximum transmission power of the selected transmission circuit, the first reduced transmission power, the second reduced transmission power or the third reduced transmission power. The signal may include the selected preamble.

Example 46 is a method for performing radio communication. The method may include transmitting radio signals with a transmission power range up to a predefined transmission power, determining a reduced transmission power based on a predefined power reduction information in accordance with a radio communication technology, generating a signal based on the reduced transmission power and applying the generated signal to the transmission circuit to be transmitted in a random access procedure.

In Example 47, the subject matter of Example 46 can optionally include that the radio communication technology may be a Long Term Evolution communication standard.

In Example 48, the subject matter of any one of Examples 46 to 47 can optionally include that the transmission circuit may be configured to modulate the signal. The application of the signal to the transmission circuit may include a modulation of the signal by the selected transmission circuit.

In Example 49, the subject matter of any one of Examples 46 to 48 can optionally include that the predefined power reduction information may include a Maximum Power Reduction information and an Additional Maximum Power Reduction information. The Maximum Power Reduction information may include Maximum Power Reductions of a plurality of Maximum Power Reductions that may be associated with frequency ranges of a plurality of frequency ranges. The Additional Maximum Power Reduction information may include Additional Maximum Power Reductions of a plurality of Additional Maximum Power Reductions that may be associated with the frequency ranges of the plurality of frequency ranges.

In Example 50, the subject matter of Example 49 can optionally include that the method may further include determining the reduced transmission power in consideration of a first minimum of the Maximum Power Reductions, a second minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power.

In Example 51, the subject matter of Example 49 can optionally include that the method may further include receiving at least one frequency range allocation information, storing the at least one frequency range allocation information, determining an anticipation information that may include a frequency range information of an anticipated frequency range of the plurality of frequency ranges based on the stored at least one frequency range allocation information and determining the reduced transmission power of the transmission circuit in consideration of a sum of the Maximum Power Reduction of the Maximum Power Reduction information that may be associated with the anticipated frequency range and the Additional Maximum Power Reduction of the Additional Maximum Power Reduction information that may be associated with the anticipated frequency range and a maximum of the sum and a Power Management Maximum Power Reduction in accordance with the Long Term Evolution communication technology by a subtraction of the maximum from the predefined transmission power of the transmission circuit.

In Example 52, the subject matter of Example 49 can optionally include that the method may further include receiving a frequency range allocation information, selecting a Maximum Power Reduction of the Maximum Power Reduction information based on the received frequency range allocation information, selecting an Additional Maximum Power Reduction of the Additional Maximum Power Reduction information based on the received frequency range allocation information and determining the reduced transmission power of the transmission circuit in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the transmission circuit.

In Example 53, the subject matter of any one of Examples 46 to 52 can optionally include that the method may further include determining the Pcmax,c information of the Long Term Evolution communication technology to be the reduced transmission power.

In Example 54, the subject matter of any one of Examples 46 to 53 can optionally include that the method may further include selecting a preamble from a plurality of preambles of a Physical Random Access Channel in accordance with the Long Term Evolution communication technology based on the reduced transmission power. The signal may include the selected preamble.

In Example 55, the subject matter of any one of Examples 46 to 54 can optionally include that the random access procedure may be a connection establishment procedure.

In Example 56, the subject matter of Example 55 can optionally include that the random access procedure may be contention-based.

In Example 57, the subject matter of any one of Examples 30 to 55 can optionally include that the second predefined transmission power is different from the first predefined transmission power.

Example 58 is a method for performing radio communication. The method may include transmitting a modified system information block based on a Long Term Evolution communication technology. The modified system information block may include a frequency range. The method may further include receiving the modified system information block and generating a signal that may include a maximum transmission power information based on the frequency range of the received modified system information block.

In Example 59, the subject matter of Example 58 can optionally include that the modified system information block may include a network signaling value that indicates frequency allocation information based on the Long Term Evolution communication technology.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a first transmission circuit configured to transmit radio signals with a first transmission power range up to a first predefined transmission power;
   a second transmission circuit configured to transmit the radio signals with a second transmission power range up to a second predefined transmission power; and
   a baseband circuit configured to:
     select a transmission circuit from the first transmission circuit and the second transmission circuit;
     determine whether the selected transmission circuit is able to reach a maximum transmission power Ppower class;
     generate a signal having a transmission power below the maximum transmission power Ppower class; and
     apply the signal to the selected transmission circuit to be transmitted by the selected transmission circuit.

2. The communication device of claim 1,
   wherein the communication device is configured in accordance with a Long Term Evolution communication technology.

3. The communication device of claim 2,
   wherein the first predefined transmission power is a first maximum transmission power of the first transmission circuit; and
   wherein the second predefined transmission power is a second maximum transmission power of the second transmission circuit.

4. The communication device of claim 3,
   wherein the baseband circuit is configured to determine the first maximum transmission power in a configuration phase of the communication device based on a measurement of the maximum of the transmission power of the first transmission circuit and the second maximum transmission power in the configuration phase based on a measurement of a maximum of the transmission power of the second transmission circuit.

5. The communication device of claim 4,
   wherein the baseband circuit is configured to determine a Pcmax,c information of the Long Term Evolution communication technology based on a substitution of a Ppowerclass information of a radio mobile communication technology by the maximum transmission power of the selected transmission circuit.

6. The communication device of claim 1,
   wherein the baseband circuit is configured to determine a reduced transmission power information that comprises a reduced transmission power of the selected transmission circuit based on a Maximum Power Reduction information and an Additional Maximum Power Reduction information;
   wherein the Maximum Power Reduction information comprises Maximum Power Reductions of a plurality of Maximum Power Reductions in accordance with the Long Term Evolution communication technology that are associated with frequency ranges of a plurality of frequency ranges; and wherein the Additional Maximum Power Reduction information comprises Additional Maximum Power Reductions of a plurality of Additional Maximum Power Reductions in accordance with the Long Term Evolution communication technology that are associated with the frequency ranges of the plurality of frequency ranges.

7. The communication device of claim 6,
wherein the reduced transmission power is a first reduced transmission power and the reduced transmission power information is a first reduced transmission power information;
wherein the baseband circuit is configured to determine the first reduced transmission power in consideration of a first minimum that is a minimum of the Maximum Power Reductions, a second minimum that is a minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power of the selected transmission circuit; and
wherein the baseband circuit is configured to generate the signal based on the first reduced transmission power information.

8. The communication device of claim 6, further comprising:
a receiver configured to receive at least one frequency range allocation information,
wherein the reduced transmission power is a second reduced transmission power and the reduced transmission power information is a second reduced transmission power information;
wherein the baseband circuit is configured to store the at least one frequency range allocation information and to determine an anticipation information that includes a frequency range information of an anticipated frequency range of the plurality of frequency ranges based on the stored frequency range allocation information;
wherein the baseband circuit is configured to determine the second reduced transmission power of the selected transmission circuit in a random access procedure in consideration of a sum of the Maximum Power Reduction of the Maximum Power Reduction information that is associated with the anticipated frequency range and the Additional Maximum Power Reduction of the Additional Maximum Power Reduction information that is associated with the anticipated frequency range and a maximum of the sum and a Power Management Maximum Power Reduction in accordance with the Long Term Evolution communication technology by a subtraction of the maximum from the predefined transmission power of the selected transmission circuit; and
wherein the baseband circuit is configured to generate the signal based on the second reduced transmission power information.

9. The communication device of claim 6, further comprising:
a receiver configured to receive a frequency range allocation information,
wherein the reduced transmission power is a third reduced transmission power and the reduced transmission power information is a third reduced transmission power information;

wherein the baseband circuit is configured to select a Maximum Power Reduction of the Maximum Power Reduction information based on the received frequency range allocation information and to select an Additional Maximum Power Reduction of the Additional Maximum Power Reduction information based on the received frequency range allocation information; and
wherein the baseband circuit is configured to determine the third reduced transmission power of the selected transmission circuit in a random access procedure in consideration of a sum of the selected Maximum Power Reduction and the selected Additional Maximum Power Reduction and a maximum of the sum and a Power Management Maximum Power Reduction in accordance with the Long Term Evolution communication technology by a subtraction of the maximum from the predefined transmission power of the selected transmission circuit; and
wherein the baseband circuit is configured to generate the signal based on the third reduced transmission power information.

10. The communication device of claim 9,
wherein the baseband circuit is configured to determine the Pcmax,c information of the Long Term Evolution communication technology to be at least one of the first reduced transmission power, the second reduced transmission power or the third reduced transmission power.

11. The communication device of claim 10,
wherein the random access procedure is a connection establishment procedure.

12. The communication device of claim 1,
wherein at least one of the first predefined transmission power or the second predefined transmission power is smaller than a transmission power of a user equipment power class in accordance with the Long Term Evolution communication technology.

13. The communication device of claim 1,
wherein the signal comprises a power headroom information.

14. The communication device of claim 13, further comprising:
a plurality of transmission circuits,
wherein the first transmission circuit and the second transmission circuit are transmission circuits of the plurality of transmission circuits;
wherein the transmission circuits are configured to transmit radio signals with transmission power ranges up to transmission powers of a plurality of predefined transmission powers, respectively; and
wherein the baseband circuit is configured to select the transmission circuit from the plurality of transmission circuits.

15. The communication device of claim 14,
wherein the power headroom information is a Power Headroom Report in accordance with the Long Term Evolution communication technology.

16. The communication device of claim 1,
wherein the second predefined transmission power is different from the first predefined transmission power.

17. A method for performing radio communication radio communication, comprising:
transmitting radio signals with a first transmission power range up to a first predefined transmission power;
transmitting the radio signals with a second transmission power range up to a second predefined transmission power;

selecting a transmission circuit from a first transmission circuit and a second transmission circuit;
determining whether the selected transmission circuit is able to reach a maximum transmission power Ppower class;
generating a signal having a transmission power below the maximum transmission power Ppower class; and
applying the signal to the selected transmission circuit to be transmitted by the selected transmission circuit.

18. The method of claim 17, wherein the signal is configured in accordance with a Long Term Evolution communication technology.

19. The method of claim 18, further comprising:
modulating the signal; and
wherein the application of the signal to the selected transmission circuit includes a modulation of the signal by the selected transmission circuit.

20. The method of claim 19, wherein the first predefined transmission power is a first maximum transmission power of the first transmission circuit; and
wherein the second predefined transmission power is a second maximum transmission power of the second transmission circuit.

21. The method of claim 20, further comprising:
determining the first maximum transmission power in a configuration phase of the method based on a measurement of the maximum of the transmission power of the first transmission circuit and the second maximum transmission power in the configuration phase based on a measurement of a maximum of the transmission power of the second transmission circuit.

22. The method of claim 21, further comprising:
determining a Pcmax,c information of the Long Term Evolution communication technology based on a substitution of a Ppowerclass information of a radio mobile communication technology by the maximum transmission power of the selected transmission circuit.

23. The method of claim 17, further comprising:
determining a reduced transmission power information that comprises a reduced transmission power of the selected transmission circuit based on a Maximum Power Reduction information and an Additional Maximum Power Reduction information,
wherein the Maximum Power Reduction information comprises Maximum Power Reductions of a plurality of Maximum Power Reductions in accordance with the Long Term Evolution communication technology that are associated with frequency ranges of a plurality of frequency ranges; and
wherein the Additional Maximum Power Reduction information comprises Additional Maximum Power Reductions of a plurality of Additional Maximum Power Reductions in accordance with the Long Term Evolution communication technology that are associated with the frequency ranges of the plurality of frequency ranges.

24. The method of claim 23, wherein the reduced transmission power is a first reduced transmission power and the reduced transmission power information is a first reduced transmission power information; and
wherein the method further comprises:
determining the first reduced transmission power in consideration of a first minimum that is a minimum of the Maximum Power Reductions, a second minimum that is a minimum of the Additional Maximum Power Reductions, a Power Management Maximum Power Reduction in accordance with the Long Term Evolution communication technology, a sum of the first minimum and the second minimum and a maximum of the sum and the Power Management Maximum Power Reduction by a subtraction of the maximum from the predefined transmission power of the selected transmission circuit,
wherein the signal comprises the first reduced transmission power information.

25. The method of claim 23, wherein at least one of the first predefined transmission power or the second predefined transmission power is smaller than a transmission power of a user equipment power class in accordance with the Long Term Evolution communication technology.

* * * * *